US011488181B2

(12) United States Patent
Madduri et al.

(10) Patent No.: US 11,488,181 B2
(45) Date of Patent: Nov. 1, 2022

(54) USER SATISFACTION IN A SERVICE BASED INDUSTRY USING INTERNET OF THINGS (IOT) DEVICES IN AN IOT NETWORK

(71) Applicant: INTERNATIONAL BUSINESS MACHINES CORPORATION, Armonk, NY (US)

(72) Inventors: Hari H. Madduri, Austin, TX (US); Maharaj Mukherjee, Poughkeepsie, NY (US); Joanna W. Ng, Unionville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 503 days.

(21) Appl. No.: 15/340,114

(22) Filed: Nov. 1, 2016

(65) Prior Publication Data

US 2018/0121936 A1     May 3, 2018

(51) Int. Cl.
*G06Q 30/02*     (2012.01)
*H04W 4/70*     (2018.01)
*H04L 67/306*     (2022.01)

(52) U.S. Cl.
CPC ..... *G06Q 30/0201* (2013.01); *G06Q 30/0282* (2013.01); *H04L 67/306* (2013.01); *H04W 4/70* (2018.02)

(58) Field of Classification Search
None
See application file for complete search history.

(56) References Cited

U.S. PATENT DOCUMENTS

| 2004/0001616 A1 | 1/2004 | Gutta et al. |
| 2007/0043608 A1 | 2/2007 | May et al. |
| 2014/0244001 A1* | 8/2014 | Glickfield ............... G08C 17/02 700/28 |

(Continued)

FOREIGN PATENT DOCUMENTS

| WO | 2004003802 A2 | 1/2004 |
| WO | 2012153320 A2 | 11/2012 |

(Continued)

OTHER PUBLICATIONS

Yang et al. Predicting User Satisfaction in Spoken Dialog System Evaluation With Collaborative Filtering. IEEE Journal of Selected Topics in Signal Processing (vol. 6, Issue: 8, pp. 971-981). Published on Dec. 1, 2012. (Year: 2012).*

(Continued)

*Primary Examiner* — Patricia H Munson
*Assistant Examiner* — Nancy N Prasad
(74) *Attorney, Agent, or Firm* — Griffiths & Seaton PLLC

(57) ABSTRACT

Embodiments for using a mixed internet of things (IoT) device network to improve user satisfaction by a processor. A collaboration of data associated with a user captured from a plurality of types of IoT devices in the IoT network may be gathered. The collaboration of data may be used to determine a level of satisfaction of the user according to a knowledge domain describing a plurality of satisfaction factors and levels in the service based industry such that the collaboration of data is associated with one or more of the plurality of satisfaction factors and levels.

15 Claims, 5 Drawing Sheets

(56) References Cited

U.S. PATENT DOCUMENTS

| | | | |
|---|---|---|---|
| 2015/0279366 A1* | 10/2015 | Krestnikov | G10L 15/26 |
| | | | 704/235 |
| 2016/0034902 A1 | 2/2016 | Bernstein | |
| 2016/0071184 A1 | 3/2016 | Joshi et al. | |
| 2016/0148247 A1 | 5/2016 | Li et al. | |
| 2017/0368413 A1* | 12/2017 | Shavit | A61B 5/1123 |
| 2018/0089605 A1* | 3/2018 | Poornachandran | |
| | | | G06Q 30/0282 |

FOREIGN PATENT DOCUMENTS

| | | | | |
|---|---|---|---|---|
| WO | WO-2013042116 A1 * | 3/2013 | | G06F 17/20 |
| WO | 2014107141 A1 | 7/2014 | | |

OTHER PUBLICATIONS

Fukuhara et al., "Improving Service Processes Based on Visualization of Human Behavior and POS Data: A Case Study in a Japanese Restaurant," Serviceology for Services: Selected papers of the 1st International Conference of Serviceology, 2014 (11 pages).

* cited by examiner

USER SATISFACTION IN A SERVICE BASED INDUSTRY USING INTERNET OF THINGS (IOT) DEVICES IN AN IOT NETWORK

BACKGROUND OF THE INVENTION

Field of the Invention

The present invention relates in general to computing systems, and more particularly to, various embodiments for improving user satisfaction in a service based industry using internet of things (IoT) devices in an IoT network using a computing processor.

Description of the Related Art

In today's society, consumers, businesspersons, educators, and others use various computing systems in a variety of settings. Current network and communications technologies, such as machine-to-machine (M2M) technologies and the Internet, allow devices to communicate more directly with each other using wired and wireless communications systems. For example, the Internet provides for a system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure.

SUMMARY OF THE INVENTION

Various embodiments for improving user satisfaction in a service based industry using internet of things (IoT) devices in an IoT network by a processor, are provided. In one embodiment, by way of example only, a method for improving a customer experience in a service based industry using a plurality of types of Internet of Things (IoT) devices in an IoT network, again by a processor, is provided. A collaboration of data associated with a user captured from a plurality of types of IoT devices in the IoT network may be gathered. The collaboration of data may be used to determine a level of satisfaction of the user according to a knowledge domain describing a plurality of satisfaction factors and levels in the service based industry such that the collaboration of data is associated with one or more of the plurality of satisfaction factors and levels.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
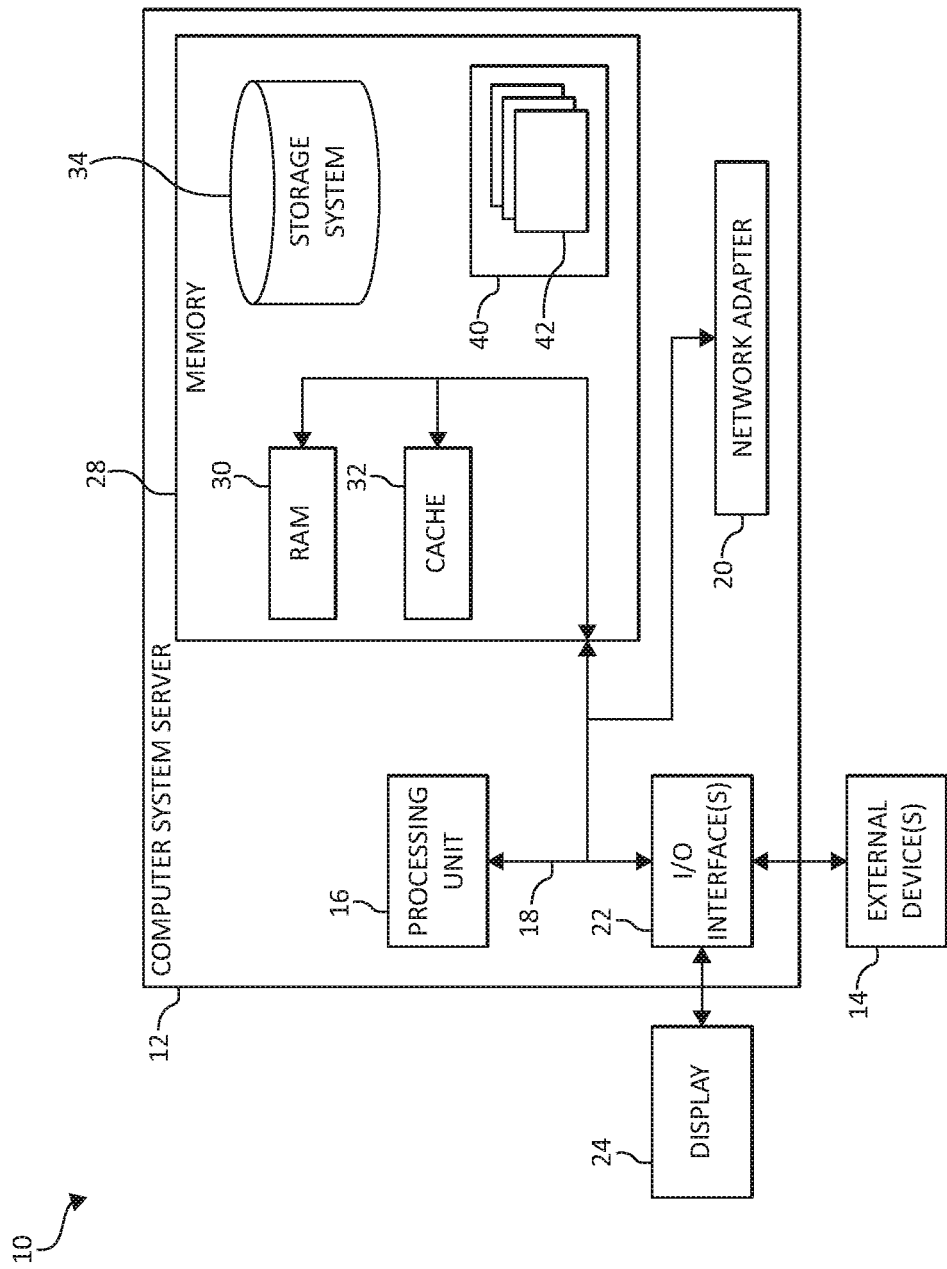
FIG. 1 is a block diagram depicting an exemplary cloud computing node according to an embodiment of the present invention.

As previously indicated, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include thermostats, sensor based devices, smoke alarms, lights, home appliances, audio systems, televisions, security cameras, security sensors, and heating, ventilation, and air conditioning (HVAC) zones, among countless other examples. Many of these objects are devices that may be independently operable, but they may also be paired with a control system.

Various devices may operate in various industries such as for example, a service based industry. A service based industry may include, for example, restaurants, hotels, resorts, cruise ships, accounting, tradesmanship, computer services, airlines, and other businesses or organizations that provides work or a service for a custom.

For example, a hotel may provide one or more service offerings to guests during a guest's stay. The quality of rooms, facilities and other amenities such as towels, bed linens, pillows, noise level, and the like are offered and designed to satisfy the guest. Some guests may have different requirements such as, for example, different types of materials and environments for minimizing allergy or intolerance to second hand smoke. If a customer's experience and satisfaction of the hotel is substantially reduced or negated, the hotel's reputation may in like manner suffer negative consequences as a guest may provide negative feedback, such as through social media outlets.

In a similar manner, restaurants and fast food chains invest significant resources for providing quality food, particularly when introducing new menu items. For example, the introduction of any new food items may include the design of a new supply chain and workflow from the supplier to the restaurants. Because of this large investment, restaurants require immediate information and feedback on the value of their investment in the new food item. To do so, restaurants rely on testing the new menu on several focus groups prior to introducing the food item to the general public. For example, in a focus group study, the focus group may partake of the new food item and then fill out a detailed questionnaire. Often, long after the food is introduced to the public, the recipe may be altered or changed based on continued feedback from the paying customers.

By way of another example, in the tourism industry, many tourists carry various computing devices with them on vacation, such as when embarking on a cruise. Again, the quality and experience afforded the guest in capturing areas of interest and importance are critical to the ongoing success and longevity of the cruise industry. As such, each of these service based industries, such as hotels, restaurants, cruise lines, and the like, often request their customers to fill out an online questionnaire to describe their satisfaction levels. However, the answers to the questions are often difficult to interpret and may not correspond to how the customer actually feels about their experience or satisfaction pertaining to the service or business providing the service.

As such, the present invention seeks to improve a customer's experience and satisfaction in a service based industry using internet of things (IoT) devices in an IoT network. A collaboration of data associated with a user, such as a guest or customer, may be collected from a plurality of types of IoT devices, such as for example, sensor based IoT devices, in the IoT network. The collaboration of data may be used to determine a level of satisfaction of the user according to a knowledge domain describing a plurality of satisfaction factors and levels in the service based industry such that the collaboration of data is associated with one or more of the plurality of satisfaction factors and levels.

For example, a customer may carry a camera with them during their stay at a hotel, visit to a restaurant, or when embarking on a cruise ship. Moreover, these industries may include cameras, recording devices, or other sensor devices at one or more locations, such as behind a hotel lobby desk, at or near a swimming pool, rooms or hallways, dining facilities, kitchens, entrances and exit locations, entertainment arena, and/or even along a tour route, and the like. These IoT devices and sensors may each capture images of people's faces, gestures, places, and/or other items of interest. Using an intelligent or "smart" cognitive service, these captured images may be compared to a knowledge domain having one or more known models and ontology to understand people's moods, emotions, gestures, facial expressions, biological data, voice inflections and tones, each of which may be interpreted and correlated to the mood, emotion, or satisfaction levels of the user. One or more statistics may be calculated and derived (e.g., a satisfaction level ranging from 1 through 10 with 10 being extremely satisfied and 1 being extremely dissatisfied) on how satisfied each user (e.g., customer) was with a given experience (dining, movie, tour, etc.). In one aspect, a calculation of a satisfaction level of the user may include one or more mathematical operations (e.g., using addition, subtraction, division, multiplication, standard deviations, means, averages, statistical modeling using statistical distributions, etc.) that may be used in the measuring, calculating, or analyzing functional operations and data.

In one aspect, a plurality of mixed types of IoT sensor devices in an IoT network, which may include temperature sensors, air-quality and allergen sensors, gas sensors, and/or cameras, may interpret, detect, and correlate emotion, facial recognition and expression, biological data, gestures so as to determine a degree or level of satisfaction (which may be a range of values). A root cause analysis may be performed to determine a root cause that may link the collection of data to one or more of a plurality of satisfaction factors and levels in a knowledge domain describing the plurality of satisfaction factors and levels in a service based industry. That is, the root cause may identify both a level or degree of satisfaction of the customer with the service while also identifying level or degree of dissatisfaction of the customer with the service. Thus, the use of mixed IoT devices improves the personalization and customer experience for various entities, such as an individual, group of persons, and/or an organization.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
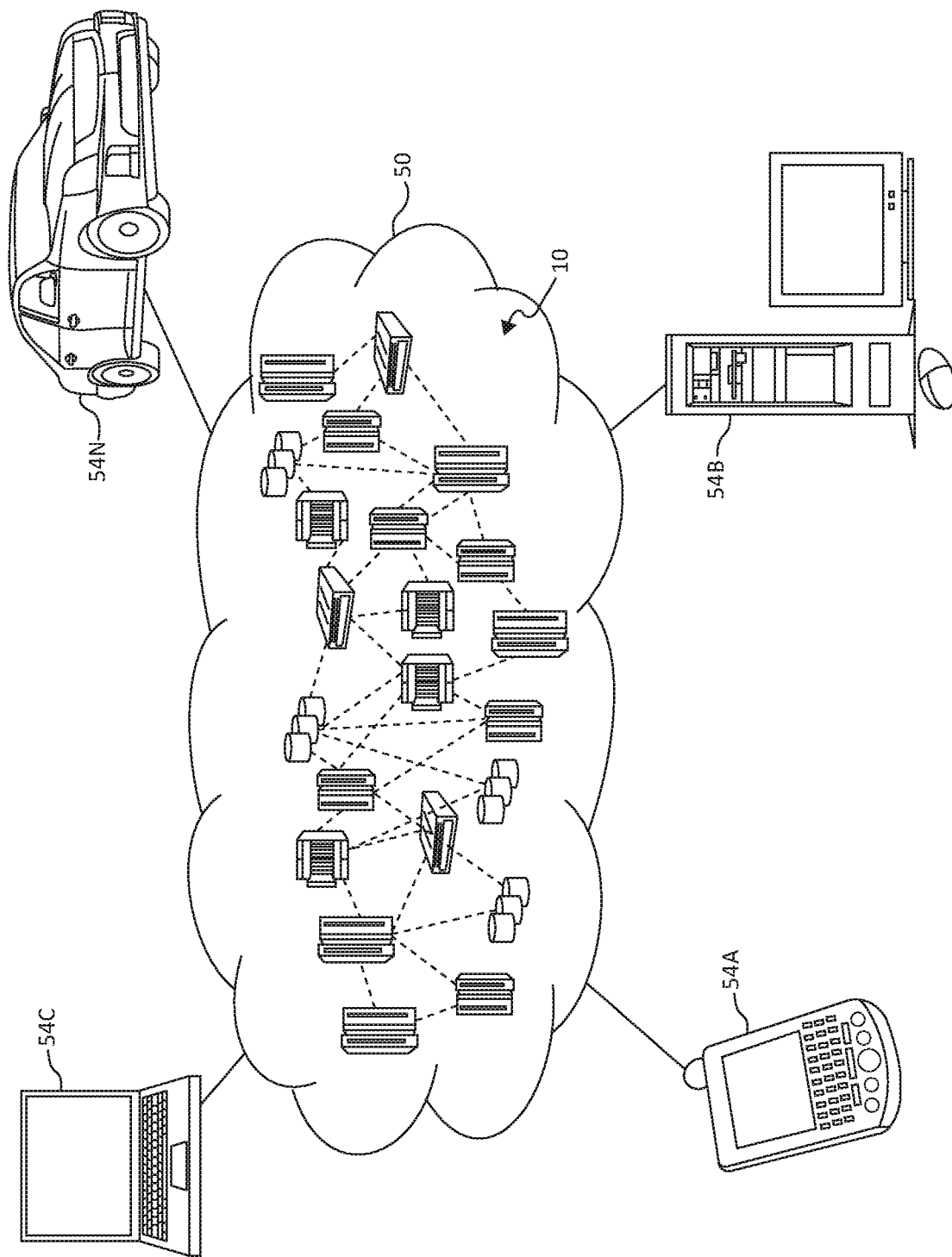
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
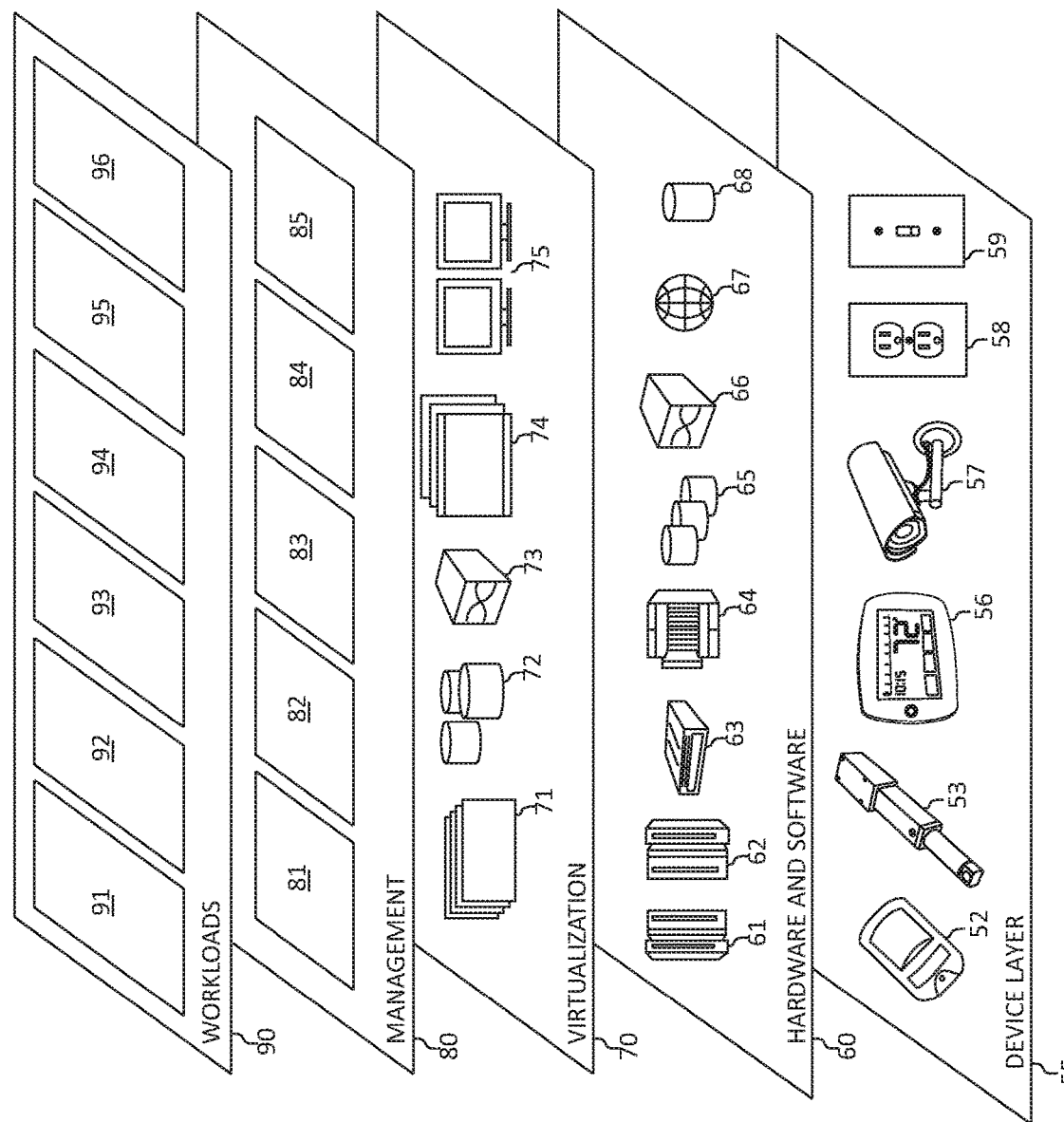
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various use of mixed IoT devices for improving user satisfaction workloads and functions 96. In addition, use of mixed IoT devices for improving user satisfaction workloads and functions 96 may include such operations as data analysis (including data collection and processing from various environmental sensors), biometric, psychophysical response analysis, physiological response analysis, facial recognition and response analysis, emotional analysis, and data analytics functions. One of ordinary skill in the art will appreciate that the use of mixed IoT devices for improving user satisfaction workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
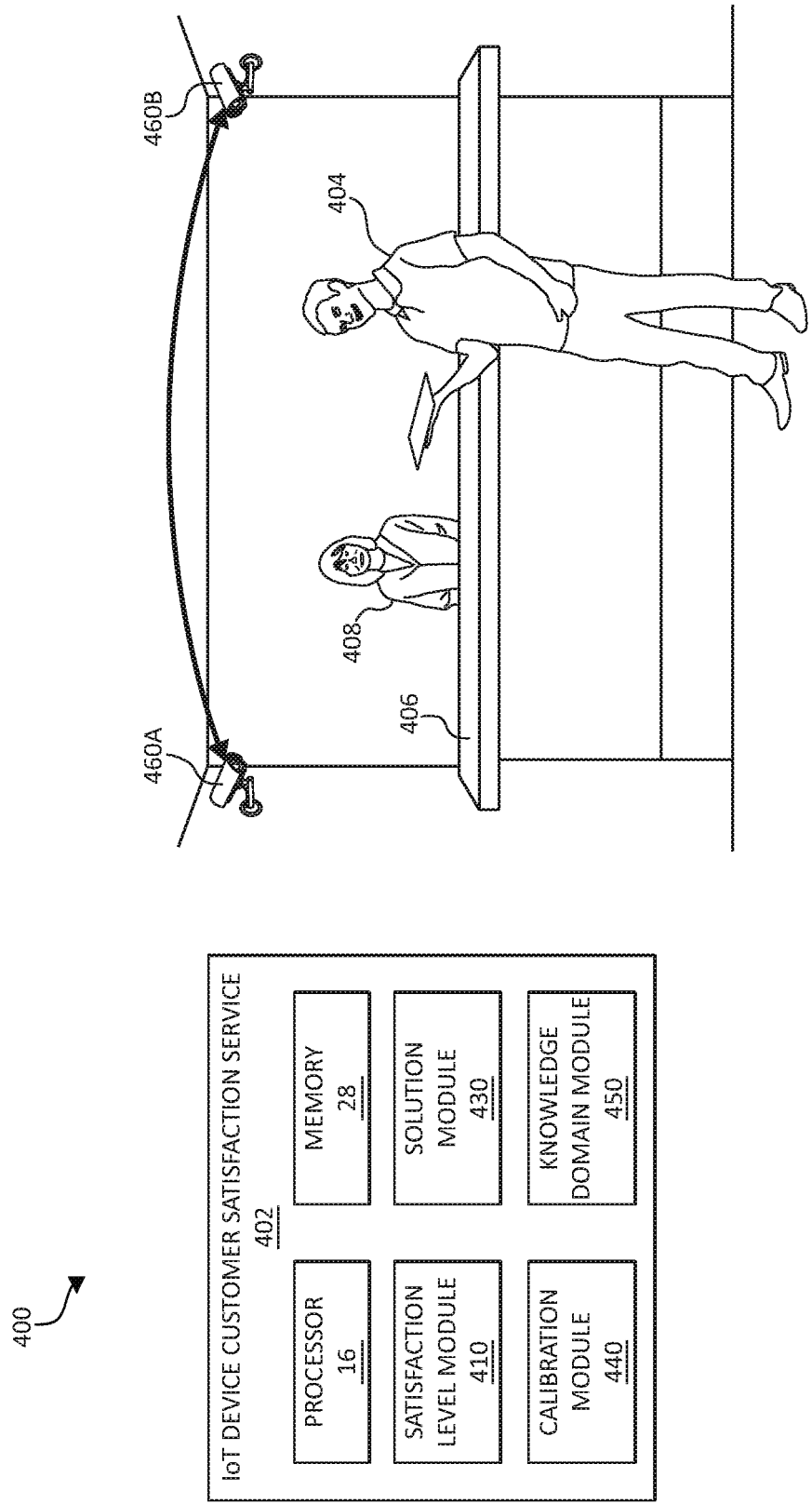
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 16 and memory 28 of FIG. 1 may be employed in FIG. 4 to perform various computational, data processing, storage and other functionality in accordance with various aspects of the present invention.

The functional components 400 may include the IoT device user satisfaction service 402 (or "IoT device customer satisfaction service 402"), having a satisfaction level module 410, a solution module 430, a calibration module 440, and a knowledge domain module 450 (e.g., a knowledge database), each of which may work in communication with each other. In one aspect, computer device 12 of FIG. 1 may include the IoT device user satisfaction service 402.

The IoT device user satisfaction service 402 may be in communication with one or more IoT devices, such as cameras 460A, 460B via one or more communication networks as described herein. The IoT device user satisfaction service 402 may gather and collect collaborative data from each of the one or more IoT devices, such as images or videos from cameras 460A, 460B in a plurality of mixed types of IoT devices in an IoT network to derive a holistic view of customer satisfaction. The satisfaction level module 410 may use the collaboration of data to determine a level of satisfaction of the user according to an ontology in the knowledge domain module 450 describing a plurality of satisfaction factors and levels in the service based industry such that the collaboration of data is associated with one or more of the plurality of satisfaction factors and levels.

The satisfaction level module 410 may apply one or more machine learning models to associate the plurality of satisfaction factors and levels with the level of satisfaction using psychophysical data, atmospheric data, environmental data, physical gestures of the customer, an emotion of the customer, speech of the customer, facial gestures, facial expressions, biological data, voice inflections and tones, an interaction detected between the customer and a service, product, or person, or a combination thereof collected from the one or more of the plurality of types of IoT devices.

For example, the satisfaction level module 410 collects the collaborative data and determines, using the knowledge domain module 450, a relationship between environment or physical stimuli and a physical, biological, and/or emotional reaction of a user, such as an interaction between a customer and an employee, and the perception of the stimuli by an observer. Psychophysical measurements may be used to monitor and determine the user's (e.g., customer) response to stimuli.

The satisfaction level module 410 analyzes the collaboration of data to determine a root cause linking one or more of the plurality of satisfaction factors and levels to the collaboration of data. That is, satisfaction level module 410 may perform a probable root cause analysis on each of the factors or stimuli that result in an increase and/or decrease to a user's satisfaction level.

For example, the satisfaction level module 410 may determine, from the collaborative data, a customer 404 has a positive level or high level of customer satisfaction (e.g., level of customer satisfaction determined to be a rating of 95% out of 100% with 100% being a highest rated or range of positive satisfaction and 0% being the lowest satisfaction or negative satisfaction) as compared to other previously determined levels of customer satisfaction upon detecting from the collaborative. That is, the root cause of the highest rated positive customer level determined according to the collaborative data of the customer 404 holding a receipt provided by the hotel attendant 408 at the hotel (e.g., at the hotel lobby desk 406) such as, for example, by detecting a facial expression with a smile, wide eyes, a hand gesture as a form of a common "fist pump", and an exclamation in a loud, audible tone "Wow, they awarded me a free night for filling out their online survey form."

In an additional example, applied in a restaurant setting (not depicted for illustrative convenience) the satisfaction level module 410 may determine, from the collaborative data, that a customer's face turns a reddish color, multiple hand gestures are observed, an increase in volume of speech, and the eyes enlarge when a waiter at a restaurant delivers late, cold food, which is also the wrong order. The root cause may be identified as the late, cold food that is the wrong food is the stimuli that produces animated hand gestures, a reddish facial color, increased volume level in the customer's speech, and enlarged eyes.

In response, one or more machine learning models may be used to associate the plurality of satisfaction factors and levels with the level of satisfaction using the collaborative data, which may include, for example, psychophysical data, atmospheric data, environmental data, physical gestures of the customer, an emotion of the customer, a speech of the customer, an interaction detected between the customer and a service, product, or person, or a combination thereof collected from the one or more of the plurality of types of IoT devices, such as cameras 460A, 460B. The collected data may be used to calibrate, by the calibration module 440, each machine learning module to learn and understand various emotions, states, audible data, physiological movements and gestures, and/or biological data of a user. Once a machine learning model is calibrated and tuned by the calibration module 440, the emotional state, mood, stress level, facial expression, speech patterns, voice tone, and/or body language, such as an angry or happy customer, expressionless entities, etc. may be used and applied for determining customer satisfaction.

The solution module 430 may provide one or more solutions for increasing the level of satisfaction upon learning, via the machine learning model, the root cause linking one or more of the plurality of satisfaction factors and levels to the collaboration of data. For example, the solution module 430 may communicate a solution to one or more IoT devices in the system to enable the IoT device to perform an action relating to the solution.

The detection of the level of satisfaction (e.g., a level of a customer's mood) may be applied and used for the root cause analysis, such as temperature, allergen, air quality in case of living areas and food recipe, such as, for example, spicy, sweet, sour, and the like. The level of satisfaction (e.g., a detection of a user's mood) may be associated with using a semantic analysis, as well as cluster based pattern matching operation, to identify an actual cause leading to a current satisfaction of dissatisfaction level.

In one aspect, the solution module 430 may communicate a solution to a graphic user interface (GUI) of a computing device or mobile. For example, the solution module 430 may communicate a solution to a display screen of a computer or mobile device of the hotel attendant 408 indicating an instant award of a free night for performing an act that triggered an award, such as, for example, filling out an online survey (which may have occurred at a previous time). In this way, the act of filling out an online survey triggers the award. The solution module 430 automatically sends to the IoT device, such as the computer system of the hotel attendant 408, the award to the guest 404.

In an additional example, the solution module 430 may communicate a solution to a graphic user interface (GUI) of a computing device or mobile such as, a manager of the restaurant indicating an immediate 10% reduction to the customer's bill. That is, the solution module 430 may communicate a solution to a computer of a computing system of the restaurant to implement an automatic price reduction to the bill. A notification may also be provided to a computer or mobile device of the manager providing notification of the automatic reduction. In one aspect, one or more learned findings and remedies may be applied and stored for future applications. It should be noted that the examples as used herein are provided for illustration purposes and should not be construed as limiting, and the embodiments described herein may apply to one or more service type industries.

In one aspect, the knowledge domain may be an ontology of concepts representing a domain of knowledge. For example, the knowledge domain module 450 may parse through a knowledge domain having an ontology of psychophysical responses and behaviors according to one or more stimuli, atmospheric data, environmental data, physical gestures of the customer, various types of emotions and stimuli that produce the emotions, speech patterns, facial gestures, facial expressions, biological data, voice inflections and tones, an interaction detected between the customer and a service, product, or person, emotional state, mood, stress level, and/or body language, or a combination thereof to assist the IoT devices in improving the customer experience and satisfaction in a service based industry using the mixed types of IoT devices in the IoT network.

A thesaurus or ontology may be used as the domain knowledge of the knowledge domain module 450 and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to physical phenomena, atmospheric, biological, physiological, environmental, scientific, industrial, educational, statistical data, medical, commercial, health, manufacturer information, biomedical-specific information, one or more stimuli and response types in a variety of applications, physical gestures of the customer, various types of emotions and stimuli that produce the various emotions, speech patterns, facial gestures, facial expressions, biological data, voice inflections and tones, an interaction detected between the customer and a service, product, or person. A domain can refer to information related to any particular subject matter or a combination of selected subjects.

In one aspect, one or more improvements to the level of satisfaction may be increased for a customer for each repeat visit related to the service provided industry. The same findings may be stored in a database so that when the same customer visits (determined by a face recognition algorithm), the machine learning model can use all previous interpretations, analysis, and/or determinations at other locations for representing the IoT services.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

The IoT device user satisfaction service may include using one or more heuristics and machine learning based models for performing one or more of the various aspects as described herein. In one aspect, the IoT device user satisfaction service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous user systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

With the foregoing functional components in view, using the machine learning models during a training process, IoT device data may be gathered to determine a level of customer satisfaction according to an emotional state, mood, stress level, facial expression, speech patterns, voice tone, and/or body language to correctly infer the satisfaction from one or more IoT devices. The collected data may be used to calibrate the machine learning model. Once the machine learning model is calibrated and tuned, the emotional state, mood, stress level, facial expression, speech patterns, voice tone, and/or body language, such as an angry or happy customer, expressionless entities, etc. may be used and applied for determining customer satisfaction.

In addition to calibrating data, such as calibrating the one or more machine learning models with known customer satisfaction surveys, the machine learning models may be validated and adjusted by observing repeated moods, one or more stimuli, atmospheric data, environmental data, physical gestures of the customer, various types of emotions and stimuli that produce the emotions, speech patterns, facial gestures, facial expressions, biological data, voice inflections and tones, an interaction detected between the customer and a service, product, or person, emotional state, mood, stress level, and/or body language, or a combination thereof, for individuals, groups, and/or other organizations on different occasions. The accuracy of determining the level of satisfaction may be continually improved with further training data.

Figure 5:
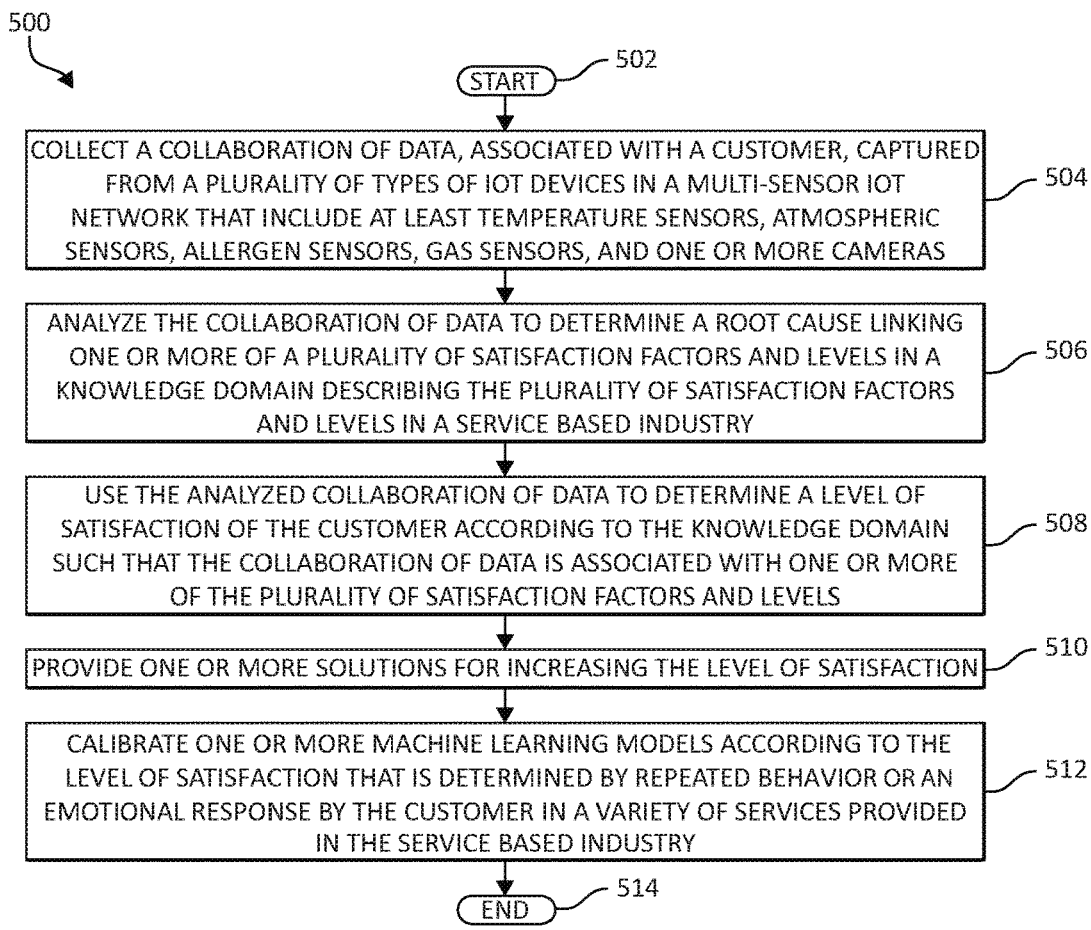
FIG. 5 is a flowchart diagram depicting an exemplary method for improving a customer experience and satisfaction in a service based industry using a plurality of types of IoT devices in an IoT network environment in which aspects of the present invention may be implemented.

Turning now to FIG. 5, a method 500 for improving a customer experience in a service based industry using a plurality of types of IoT devices in an IoT network by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502. A collaboration of data, associated with a user (e.g., a customer), that is captured from a plurality of types of IoT devices in a multi-sensor IoT network that include at least temperature sensors, atmospheric sensors, allergen sensors, gas sensors, and one or more cameras, may be collected, as in block 504. The collaboration of data may be analyzed to determine a root cause linking one or more of a plurality of satisfaction factors and levels in a knowledge domain describing the plurality of satisfaction factors and levels in a service based industry, as in block 506. The analyzed collaboration of data may be used to determine a level of satisfaction of the customer according to the knowledge domain such that the collaboration of data is associated with one or more of the plurality of satisfaction factors and levels, as in block 508. One or more solutions may be provided for increasing the level of satisfaction, as in block 510. One or more machine learning models may be calibrated according to the level of satisfaction that is determined by repeated behavior or an emotional response by the customer in a variety of services provided in the service based industry, as in block 512. The functionality 500 may end, as in block 514.

Figure 6:
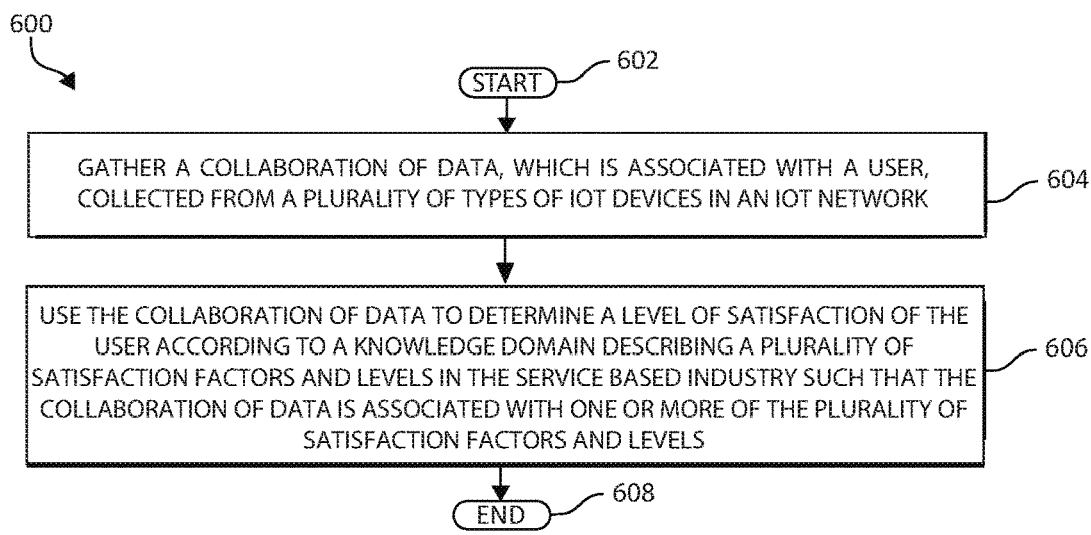
FIG. 6 is a flowchart diagram depicting an exemplary method for improving user satisfaction in a service based industry using internet of things (IoT) devices in an IoT network environment in which aspects of the present invention may be implemented.

Turning now to FIG. 6, a method 600 for improving a customer experience in a service based industry using a plurality of types of IoT devices in an IoT network by a processor is depicted, in which various aspects of the illustrated embodiments may be implemented. That is, FIG. 6 is a flowchart of an additional example method 600 for improving a customer experience in a service based industry using a plurality of mixed-types of IoT devices in an IoT network according to an example of the present invention. The functionality 600 may be implemented as a method executed as instructions on a machine, where the instructions are included on at least one computer readable medium or one non-transitory machine-readable storage medium. The functionality 600 may start in block 602. A collaboration of data, associated with a user, may be collected or captured from a plurality of types of IoT devices in the IoT network, as in block 604. The collaboration of data may be used to determine a level of satisfaction of the user according to a knowledge domain describing a plurality of satisfaction factors and levels in the service based industry such that the collaboration of data is associated with one or more of the plurality of satisfaction factors and levels, as in block 606. The functionality 600 may end, as in block 608.

In one aspect, in conjunction with and/or as part of at least one block of FIG. 6, the operations of 600 may include each of the following. The operations of 600 may include gathering the collaboration of data from each type of a plurality of sensor based IoT devices to create a customer satisfaction profile such that a relationship is created between the customer satisfaction profile and the knowledge domain. The plurality of sensor based IoT devices may include at least temperature sensors, atmospheric sensors, allergen sensors, gas sensors, and one or more cameras.

The operations of 600 may apply one or more machine learning models to associate the plurality of satisfaction factors and levels with the level of satisfaction using psychophysical data, atmospheric data, environmental data, physical gestures of the customer, an emotion of the customer, a speech of the customer, an interaction detected between the customer and a service, product, or person, or a combination thereof collected from the one or more of the plurality of types of IoT devices. The collaboration of data may be analyzed to determine a root cause linking one or more of the plurality of satisfaction factors and levels to the collaboration of data. One or more solutions may be provided for increasing the level of satisfaction upon learning via a machine learning model a root cause linking one or more of the plurality of satisfaction factors and levels to the collaboration of data. A lexical analysis, parsing, extraction of concepts, semantic analysis, one or more cluster patterns, natural language processing (NLP), or a combination thereof may be used to determine a root cause linking one or more of the plurality of satisfaction factors and levels to the collaboration of data to determine the level of satisfaction. One or more machine learning models may be calibrated according to the level of satisfaction that is determined for each one of a plurality of services relating to the service based industry.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, improving user satisfaction in a service based industry using internet of things (IoT) devices in an IoT network, comprising:

gathering a collaboration of data associated with a user captured from a plurality of types of IoT devices in the IoT network;

using the collaboration of data to determine a level of satisfaction of the user during a visit to a physical location according to a knowledge domain describing a plurality of satisfaction factors and levels in the service based industry such that the collaboration of data is associated with one or more of the plurality of satisfaction factors and levels; wherein one of the plurality of types of IoT devices comprises a sound capturing device, and wherein gathering the collaboration of data includes capturing utterances of a speech of the user;

executing, by a computing system, machine learning logic to analyze the utterances of the speech of the user, using Natural Language Processing (NLP) and a semantic analysis comparing the utterances to the knowledge domain, to generate a machine learning model correlating at least a portion of the plurality of satisfaction levels to a root cause; wherein the root cause is associated with at least one of an ambient temperature, customer service, dwelling area quality, and food quality;

calibrating the machine learning model specifically for the user according to the level of satisfaction that is determined for each one of a plurality of services and types of retail organizations relating to the service based industry; wherein calibrating the machine learning model includes determining speech patterns, voice tones, and semantic language the user uses in expressing the level of satisfaction based on the analyzed utterances, and wherein calibrating the machine learning model further includes identifying, for each of the plurality of services and types of retail organizations the user patronizes, respective combinations of factors of the plurality of satisfaction factors and levels contribute to the level of satisfaction of the user, inclusive of determining the respective combinations of factors when the user patronizes the types of retail organizations individually and in a group environment;

displaying one or more solutions on a display of the computing system to increase the level of satisfaction based on an output of the machine learning model according to the root cause linked to the one or more of the plurality of satisfaction factors and levels to the collaboration of data; and responsive to detecting the user is visiting an alternative physical location via a determination of the user through a facial recognition algorithm, using findings of the level of satisfaction stored in a database from the visit to the physical location with respect to the visit to the alternative physical location such that, when analyzing the collaboration of data at the alternative physical location, the machine learning model employs all previous analyses and determinations concluded during the visit to the physical location to determine the satisfaction of the user during the visit to the alternative physical location.

2. The method of claim 1, further including collecting the collaboration of data from each type of a plurality of sensor based IoT devices to create a customer satisfaction profile such that a relationship is created between the customer satisfaction profile and the knowledge domain, wherein the plurality of sensor based IoT devices include at least temperature sensors, atmospheric sensors, allergen sensors, gas sensors, and one or more cameras.

3. The method of claim 1, further including applying the machine learning model to associate the plurality of satisfaction factors and levels with the level of satisfaction using psychophysical data, atmospheric data, environmental data, physical gestures of the user, an emotion of the user, an interaction detected between the user and a service, product, or person, or a combination thereof collected from the one or more of the plurality of types of IoT devices.

4. The method of claim 1, further including analyzing the collaboration of data to determine the root cause linking one or more of the plurality of satisfaction factors and levels to the collaboration of data.

5. The method of claim 1, further including using a lexical analysis, parsing, extraction of concepts, one or more cluster patterns, or a combination thereof to determine the root cause linking one or more of the plurality of satisfaction factors and levels to the collaboration of data to determine the level of satisfaction.

6. A system for improving user satisfaction in a service based industry using internet of things (IoT) devices in an IoT network, comprising:

a processor, operational within and between a distributed computing environment, that:
   gathers a collaboration of data associated with a user captured from a plurality of types of IoT devices in the IoT network;
   uses the collaboration of data to determine a level of satisfaction of the user during a visit to a physical location according to a knowledge domain describing a plurality of satisfaction factors and levels in the service based industry such that the collaboration of data is associated with one or more of the plurality of satisfaction factors and levels; wherein one of the plurality of types of IoT devices comprises a sound capturing device, and wherein gathering the collaboration of data includes capturing utterances of a speech of the user;
   executes, by a computing system, machine learning logic to analyze the utterances of the speech of the user, using Natural Language Processing (NLP) and a semantic analysis comparing the utterances to the knowledge domain, to generate a machine learning model correlating at least a portion of the plurality of satisfaction levels to a root cause; wherein the root cause is associated with at least one of an ambient temperature, customer service, dwelling area quality, and food quality;
   calibrates the machine learning model specifically for the user according to the level of satisfaction that is determined for each one of a plurality of services and types of retail organizations relating to the service based industry; wherein calibrating the machine learning model includes determining speech patterns, voice tones, and semantic language the user uses in expressing the level of satisfaction based on the analyzed utterances, and wherein calibrating the machine learning model further includes identifying, for each of the plurality of services and types of retail organizations the user patronizes, respective combinations of factors of the plurality of satisfaction factors and levels contribute to the level of satisfaction of the user, inclusive of determining the respective combinations of factors when the user patronizes the types of retail organizations individually and in a group environment;
   displays one or more solutions on a display of the computing system to increase the level of satisfaction based on an output of the machine learning model according to the root cause linked to the one or more of the plurality of satisfaction factors and levels to the collaboration of data; and
   responsive to detecting the user is visiting an alternative physical location via a determination of the user through a facial recognition algorithm, uses findings of the level of satisfaction stored in a database from the visit to the physical location with respect to the visit to the alternative physical location such that, when analyzing the collaboration of data at the alternative physical location, the machine learning model employs all previous analyses and determinations concluded during the visit to the physical location to determine the satisfaction of the user during the visit to the alternative physical location.

7. The system of claim 6, wherein the processor collects the collaboration of data from each type of a plurality of sensor based IoT devices to create a customer satisfaction profile such that a relationship is created between the customer satisfaction profile and the knowledge domain, wherein the plurality of sensor based IoT devices include at least temperature sensors, atmospheric sensors, allergen sensors, gas sensors, and one or more cameras.

8. The system of claim 6, wherein the processor applies the machine learning model to associate the plurality of satisfaction factors and levels with the level of satisfaction using psychophysical data, atmospheric data, environmental data, physical gestures of the user, an emotion of the user, an interaction detected between the user and a service, product, or person, or a combination thereof collected from the one or more of the plurality of types of IoT devices.

9. The system of claim 6, wherein the processor analyzes the collaboration of data to determine the root cause linking one or more of the plurality of satisfaction factors and levels to the collaboration of data.

10. The system of claim 6, wherein the processor uses a lexical analysis, parsing, extraction of concepts, one or more cluster patterns, or a combination thereof to determine the root cause linking one or more of the plurality of satisfaction factors and levels to the collaboration of data to determine the level of satisfaction.

11. A computer program product for, by a processor, improving user satisfaction in a service based industry using internet of things (IoT) devices in an IoT network, the computer program product comprising a non-transitory computer-readable storage medium having computer-readable program code portions stored therein, the computer-readable program code portions comprising:

an executable portion that gathers a collaboration of data associated with a user captured from a plurality of types of IoT devices in the IoT network;

an executable portion that uses the collaboration of data to determine a level of satisfaction of the user during a visit to a physical location according to a knowledge domain describing a plurality of satisfaction factors and levels in the service based industry such that the collaboration of data is associated with one or more of the plurality of satisfaction factors and levels; wherein one of the plurality of types of IoT devices comprises a sound capturing device, and wherein gathering the collaboration of data includes capturing utterances of a speech of the user;

an executable portion that executes, by a computing system, machine learning logic to analyze the utterances of the speech of the user, using Natural Language Processing (NLP) and a semantic analysis comparing the utterances to the knowledge domain, to generate a machine learning model correlating at least a portion of the plurality of satisfaction levels to a root cause; wherein the root cause is associated with at least one of an ambient temperature, customer service, dwelling area quality, and food quality;

an executable portion that calibrates the machine learning model specifically for the user according to the level of satisfaction that is determined for each one of a plurality of services and types of retail organizations relating to the service based industry; wherein calibrating the machine learning model includes determining speech patterns, voice tones, and semantic language the user uses in expressing the level of satisfaction based on the analyzed utterances, and wherein calibrating the machine learning model further includes identifying, for each of the plurality of services and types of retail organizations the user patronizes, respective combinations of factors of the plurality of satisfaction factors and levels contribute to the level of satisfaction of the user, inclusive of determining the respective combinations of factors when the user patronizes the types of retail organizations individually and in a group environment;

an executable portion that displays one or more solutions on a display of the computing system to increase the level of satisfaction based on an output of the machine learning model according to the root cause linked to the one or more of the plurality of satisfaction factors and levels to the collaboration of data; and an executable portion that, responsive to detecting the user is visiting an alternative physical location via a determination of the user through a facial recognition algorithm, uses findings of the level of satisfaction stored in a database from the visit to the physical location with respect to the visit to the alternative physical location such that, when analyzing the collaboration of data at the alternative physical location, the machine learning model employs all previous analyses and determinations concluded during the visit to the physical location to determine the satisfaction of the user during the visit to the alternative physical location.

12. The computer program product of claim 11, further including an executable portion that collects the collaboration of data from each type of a plurality of sensor based IoT devices to create a customer satisfaction profile such that a relationship is created between the customer satisfaction profile and the knowledge domain, wherein the plurality of sensor based IoT devices include at least temperature sensors, atmospheric sensors, allergen sensors, gas sensors, and one or more cameras.

13. The computer program product of claim 11, further including an executable portion that applies the machine learning model to associate the plurality of satisfaction factors and levels with the level of satisfaction using psychophysical data, atmospheric data, environmental data, physical gestures of the user, an emotion of the user, an interaction detected between the user and a service, product, or person, or a combination thereof collected from the one or more of the plurality of types of IoT devices.

14. The computer program product of claim 11, further including an executable portion that analyzes the collaboration of data to determine the root cause linking one or more of the plurality of satisfaction factors and levels to the collaboration of data.

15. The computer program product of claim 11, further including an executable portion that uses a lexical analysis, parsing, extraction of concepts, one or more cluster patterns, or a combination thereof to determine the root cause linking one or more of the plurality of satisfaction factors and levels to the collaboration of data to determine the level of satisfaction.

* * * * *